US012643959B2

(12) United States Patent
Aoki

(10) Patent No.: US 12,643,959 B2
(45) Date of Patent: Jun. 2, 2026

(54) PRODUCTION METHOD FOR CELLULOSE COMPLEX, PRODUCTION METHOD FOR CELLULOSE COMPLEX/RESIN COMPOSITION, CELLULOSE COMPLEX, AND CELLULOSE COMPLEX/RESIN COMPOSITION

(71) Applicant: NATIONAL UNIVERSITY CORPORATION SHIZUOKA UNIVERSITY, Shizuoka (JP)

(72) Inventor: Kenji Aoki, Shizuoka (JP)

(73) Assignee: NATIONAL UNIVERSITY CORPORATION SHIZUOKA UNIVERSITY, Shizuoka (JP)

( * ) Notice: Subject to any disclaimer, the term of this patent is extended or adjusted under 35 U.S.C. 154(b) by 1046 days.

(21) Appl. No.: 17/769,641

(22) PCT Filed: Sep. 25, 2020

(86) PCT No.: PCT/JP2020/036244
§ 371 (c)(1),
(2) Date: Apr. 15, 2022

(87) PCT Pub. No.: WO2021/075224
PCT Pub. Date: Apr. 22, 2021

(65) Prior Publication Data
US 2024/0132629 A1     Apr. 25, 2024
US 2024/0228672 A9     Jul. 11, 2024

(30) Foreign Application Priority Data

Oct. 17, 2019     (JP) ................................. 2019-190140

(51) Int. Cl.
*C08B 15/00*         (2006.01)
*C08G 81/02*         (2006.01)
(Continued)

(52) U.S. Cl.
CPC .............. *C08B 15/00* (2013.01); *C08G 81/02* (2013.01); *C08J 3/215* (2013.01); *C08K 7/02* (2013.01);
(Continued)

(58) Field of Classification Search
CPC ............................ C08L 101/00; C08L 87/005
See application file for complete search history.

(56) References Cited

U.S. PATENT DOCUMENTS

2015/0105499 A1     4/2015  Yano
2015/0376298 A1     12/2015  Nakatsubo
(Continued)

FOREIGN PATENT DOCUMENTS

JP         S62-39642 A      2/1987
JP         2009167249 A  *  7/2009
(Continued)

OTHER PUBLICATIONS

International Search Report for International Application No. PCT/JP2020/036244 dated Dec. 22, 2020 (3 sheets, 3 sheets translation, 6 sheets total).
(Continued)

*Primary Examiner* — Eli D. Strah
(74) *Attorney, Agent, or Firm* — Kratz, Quintos & Hanson, LLP

(57)         ABSTRACT

Provided are a method for producing a cellulose complex capable of substantially uniformly dispersing cellulose in a resin without adding a compatibilizer (dispersant) while maintaining the properties of cellulose, a method for producing a cellulose complex/resin composition, a cellulose complex, and a cellulose complex/resin composition. The method for producing a cellulose complex includes a mixing step of mixing cellulose having a hydroxy group with a polymer having a reactive group capable of reacting with the
(Continued)

hydroxy group and including a nonpolar polymer as a molecular chain, and a step of bonding the hydroxy group and the reactive group.

5 Claims, 6 Drawing Sheets

(51) Int. Cl.

| | |
|---|---|
| *C08J 3/215* | (2006.01) |
| *C08K 7/02* | (2006.01) |
| *C08K 9/04* | (2006.01) |
| *C08L 87/00* | (2006.01) |
| *C08L 101/00* | (2006.01) |
| *C08J 5/04* | (2006.01) |

(52) U.S. Cl.
CPC ............. *C08K 9/04* (2013.01); *C08L 87/005* (2013.01); *C08L 101/00* (2013.01); *C08J 5/045* (2013.01); *C08J 2301/02* (2013.01); *C08J 2423/14* (2013.01)

(56) References Cited

U.S. PATENT DOCUMENTS

| | | |
|---|---|---|
| 2016/0002461 A1 | 1/2016 | Tsujii |
| 2016/0137751 A1 | 5/2016 | Harada |
| 2018/0037737 A1 | 2/2018 | Semba |
| 2018/0362405 A1 | 12/2018 | Tsujii |
| 2019/0023882 A1 | 1/2019 | Kim |

FOREIGN PATENT DOCUMENTS

| | | | |
|---|---|---|---|
| JP | 2014-162880 A | | 9/2014 |
| JP | 2016-176052 A | | 10/2016 |
| JP | 2017-105983 A | | 6/2017 |
| JP | 2017141323 A | * | 8/2017 |
| JP | 2018-203940 A | | 12/2018 |
| WO | 2013/133093 A1 | | 9/2013 |
| WO | 2014/119745 A1 | | 8/2014 |
| WO | 2015/009972 A1 | | 1/2015 |
| WO | 2015/040884 A1 | | 3/2015 |
| WO | 2017-25174 A | | 2/2017 |
| WO | 2017/170747 A1 | | 10/2017 |

OTHER PUBLICATIONS

Communication Pursuant to Article 97(2) EPC for corresponding European Patent Application No. 20875680.9 dated Apr. 24, 2025 (9 sheets).

N. Ljungberg, et al.; "New Nanocomposite materials reinforced with cellulose whiskers in atactic polypropylene: effect of surface and dispersion characteristics"; Biomacromolecules; vol. 6; Sep. 30, 2005; pp. 2732-2739; XP093270973.

E. Bahar, et al.; "Thermal and mechanical properties of polypropylene nanocomposite materials reinforced with cellulose nano whiskers"; Journal of Applied Polymer Science; vol. 125; No. 41; Jan. 31, 2012; pp. 2882-2889; XP055343224; US ISSN: 0021-8995; DOI: 10.1002/app.36445.

Extended European Search Report for European Patent Application No. 20875680.9 dated Dec. 21, 2022 (35 sheets).

* cited by examiner

PRODUCTION METHOD FOR CELLULOSE COMPLEX, PRODUCTION METHOD FOR CELLULOSE COMPLEX/RESIN COMPOSITION, CELLULOSE COMPLEX, AND CELLULOSE COMPLEX/RESIN COMPOSITION

TECHNICAL FIELD

The present invention relates to a production method for cellulose complex, a production method for cellulose complex/resin composition, a cellulose complex, and a cellulose complex/resin composition. In particular, the present invention relates to a production method for a cellulose complex capable of substantially uniformly dispersing cellulose in a nonpolar resin, a production method for a cellulose complex/resin composition, a cellulose complex, and a cellulose complex/resin composition.

BACKGROUND ART

In various industrial fields (such as the automobile field), attempts have been made to utilize biomass for resins such as olefin resins from the viewpoint of bioeconomy. Therefore, a technique of compositing cellulose such as cellulose fiber and cellulose nanofiber (CNF) with an olefin resin or the like has been studied.

Cellulose and cellulose nanofiber (CNF) are obtained from pulp or the like as a raw material through mechanical defibration in water or the like and therefore exist in a state of containing a large amount of water dispersion or moisture. In the case of compositing cellulose or CNF with a resin, it is first necessary to remove moisture from cellulose or CNF. In this case, when normal heat drying treatment is applied to cellulose or CNF, cellulose or CNF form a strong aggregate due to hydrogen bonding of cellulose or CNF. Even if this aggregate is pulverized, the effect that cellulose or CNF is originally expected to have is not exhibited. Therefore, various methods for extracting CNF capable of suppressing aggregation of cellulose and CNF and methods for dispersing cellulose in a resin for the purpose of suppressing aggregation have been studied.

Here, when a resin to be composited with cellulose is nonpolar, it is difficult to perform compositing due to incompatibility between the resin and cellulose, which is polar. In addition, it is also difficult to suppress aggregation of cellulose in the composite material. Therefore, for example, a technique has been proposed in which cellulose and a resin are composited by adding a compatibilizer (dispersant) to composite cellulose and the resin.

A composition has conventionally been known that contains cellulose and a dispersant, in which the dispersant includes a resin affinity segment A and a cellulose affinity segment B and has a block copolymer structure or a gradient copolymer structure (e.g., refer to Patent Literature 1). According to the composition disclosed in Patent Literature 1, dispersibility of cellulose in a resin can be improved.

CITATION LIST

Patent Literature

Patent Literature 1: JP 2014-162880 A

SUMMARY OF INVENTION

Technical Problem

However, in the composition disclosed in Patent Literature 1, when cellulose is dispersed in a resin, addition of the dispersant cannot be omitted, and thus the effort and cost for producing a composite of cellulose and the resin increase. In addition, although a method of hydrophobizing a cellulose surface has been conventionally performed, it is not possible to omit purification treatment in such a method, and the case is also expected where it is difficult to maintain the properties of cellulose due to various treatments, and the effort and cost of production further increase.

Accordingly, an object of the present invention is to provide a production method for a cellulose complex capable of substantially uniformly dispersing cellulose in a resin without adding a compatibilizer (dispersant) while maintaining the properties of cellulose, a production method for a cellulose complex/resin composition, a cellulose complex, and a cellulose complex/resin composition.

Solution to Problem

In order to achieve the above object, the present invention provides a production method for a cellulose complex including a mixing step of mixing cellulose having a hydroxy group with a polymer having a reactive group capable of reacting with the hydroxy group and including a nonpolar polymer as a molecular chain, and a step of bonding the hydroxy group and the reactive group.

In addition, in order to achieve the above object, the present invention provides a production method for a cellulose complex/resin composition including a step of kneading the cellulose complex obtained by the production method for a cellulose complex described above with a predetermined nonpolar resin.

In addition, in order to achieve the above object, the present invention provides a cellulose complex in which a nonpolar polymer is bonded to a hydroxy group of cellulose via a reactive group.

In addition, in order to achieve the above object, the present invention provides a cellulose complex/resin composition including the cellulose complex described above and a predetermined nonpolar resin.

Advantageous Effects of Invention

According to the production method for a cellulose complex, the production method for a cellulose complex/resin composition, the cellulose complex, and the cellulose complex/resin composition according to the present invention, it is possible to provide a production method for a cellulose complex capable of substantially uniformly dispersing cellulose in a resin without adding a compatibilizer (dispersant) while maintaining the properties of cellulose, a production method for a cellulose complex/resin composition, a cellulose complex, and a cellulose complex/resin composition.

3

Figure 6:
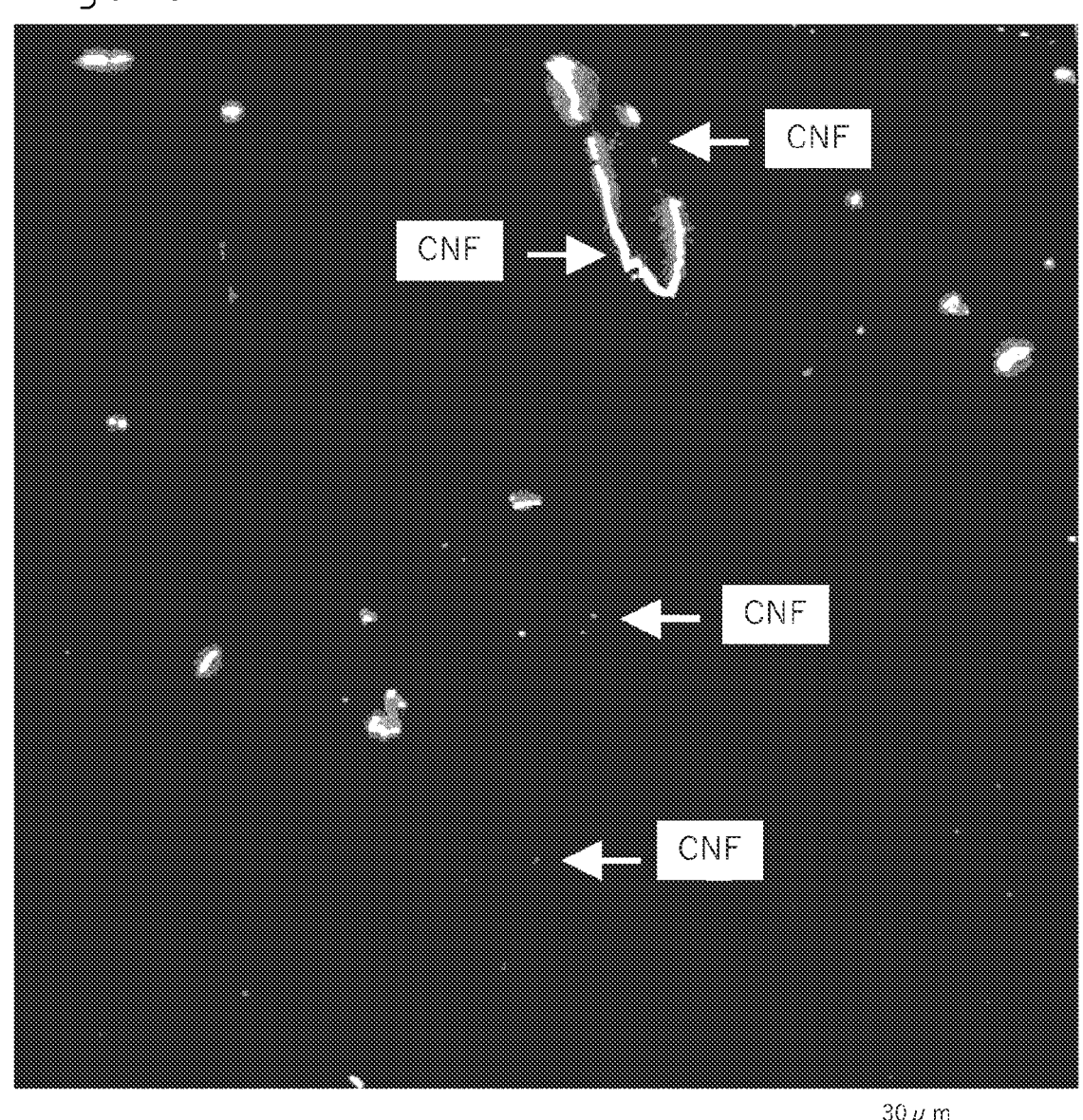

FIG. 6 shows a SEM observation result of a sample according to Comparative Example 3.

DESCRIPTION OF EMBODIMENT

Embodiment

<Background of Idea of Cellulose Complex>

Hitherto, when a predetermined reactive group is allowed to react with a hydroxy group of cellulose or cellulose nanofiber (CNF) to bond the groups, it has been sometimes recognized that it is necessary to make the hydroxy group of cellulose reactive. However, the present inventor has attempted to introduce maleic anhydride-modified polypropylene (MAPP) into cellulose using a cellulose aqueous dispersion and a MAPP emulsion on the basis of the counterintuitive idea that if the reactive group is a reactive group having reactivity with a hydroxy group, a predetermined bond can be formed without providing a treatment or step for activating the hydroxy group, by, for example, improving the contact probability between the hydroxy group and the reactive group (e.g., by using a polymer having a reactive group as a side chain on a main chain having a molecular weight of a predetermined molecular weight or more to allow the side chain to also move along with movement of the main chain or the like to improve the contact probability of cellulose with the hydroxy group, and by allowing the hydroxy group and the reactive group to react in a "field" where the hydroxy group and/or the reactive group easily collide with each other). As a result, the present inventor has surprisingly found that an ester bond is easily formed between a hydroxy group of cellulose and a succinic anhydride group of MAPP by heating at a relatively low temperature. The present invention is based on such findings.

<Outline of Cellulose Complex>

The cellulose complex according to an embodiment of the present invention is formed by bonding a nonpolar polymer to a hydroxy group of cellulose via a reactive group. Unlike the conventional treatment in which the cellulose surface is hydrophobized using a low-molecular-weight (e.g., an organic compound having a weight average molecular weight of about 1,000 or less. However, for example, MA oligomers of dodecamer or so of maleic anhydride (weight average molecular weight of about 1,200) are excluded) organic compound, in the cellulose complex according to the present embodiment, a nonpolar polymer is bonded to cellulose as what is called a "compatibilizing group" (conceptually, a high-molecular-weight compatibilizer is directly bonded to cellulose). Thus, when the cellulose complex according to the present embodiment is dispersed in a predetermined nonpolar resin, it is not necessary to add a compatibilizer (dispersant).

The cellulose complex further contains a polymer (that is, a polymer containing the reactive group and the nonpolar polymer. In other words, the molecular chain is the nonpolar polymer, and a reactive group is bonded to the molecular chain) captured by the cellulose complex. Here, the term "captured" means at least one of the fact that the polymer is fixed to the cellulose complex to such an extent that the polymer is not easily separated from the cellulose complex, the fact that the polymer is entangled with the cellulose complex, and the fact that at least a part of the cellulose complex is coated. When the cellulose complex contains the polymer captured by the cellulose complex, the captured polymer also exerts a function as a compatibilizer while being captured, so that cellulose is more easily dispersed in the nonpolar resin.

In the present embodiment, the "molecular chain" refers to a configuration including all or a part of a polymer, an oligomer molecule, or a block composed of constituent units linearly or branchedly connected to a terminal group or a branch point or between boundary constituent units peculiar to the polymer.

<Details of Cellulose Complex>

The cellulose complex according to the present embodiment is a composite formed by bonding a nonpolar polymer to cellulose via a predetermined bond formed by the reaction of a predetermined reactive group with a hydroxy group of cellulose. The cellulose complex can be obtained in powder form. As cellulose, cellulose fiber and/or cellulose nanofiber (CNF) can be used.

(Cellulose Fiber)

As the cellulose fiber according to the present embodiment, various cellulose fibers can be used as long as they have hydroxy groups on the surface. As the cellulose fiber, one or more kinds of cellulose fiber selected from plant-derived cellulose fiber, animal-derived cellulose fiber (e.g., cellulose fiber isolated from ascidians or sea grass), microorganism-derived cellulose fiber (e.g., cellulose fiber produced by acetic acid bacteria), and the like can be used. From the viewpoint of practicality, price, and/or availability, it is preferable to use plant-derived cellulose fiber as the cellulose fiber.

Examples of the raw material of plant-derived cellulose fiber include plant fiber such as pulp obtained from natural plant raw materials such as wood, bamboo, hemp, jute, kenaf, cotton, beet, agricultural product residue, and cloth. Examples of the raw material of the cellulose fiber include old paper such as old newspapers, old corrugated cardboard, magazine old paper, and old copy paper. Examples of the wood include Japanese cedar, Japanese cypress, eucalyptus, and acacia. As a raw material of the cellulose fiber, pulp or fibrillated cellulose obtained by fibrillating pulp can also be used. The raw materials of the cellulose fiber may be used singly or in combination of two or more kinds thereof.

When a plant-derived raw material (that is, plant fiber) is used as the raw material of the cellulose fiber, it is preferable to remove lignin in the plant fiber. That is, the plant fiber has a structure in which the space between the cellulose fiber is filled with lignin and hemicellulose, and have a structure in which a part or all of the periphery of a bundle of cellulose microfibrils is coated with hemicellulose and/or lignin. Further, the fiber has a structure in which hemicellulose covers the periphery of cellulose microfibrils and/or a bundle of cellulose microfibrils and in which lignin covers the hemicellulose. As a result, plant fiber is formed in a state where cellulose fiber is firmly bonded to each other by lignin. Therefore, from the viewpoint of suppressing aggregation of cellulose fibers in plant fibers, it is preferable to remove lignin in the plant fibers.

For example, the amount of lignin in the raw material may be adjusted by subjecting the raw material of cellulose fiber to a treatment such as a delignification treatment and a bleaching treatment as necessary. In the present embodiment, the lignin content in the raw material of cellulose fiber is not particularly limited, but from the viewpoint of suppressing aggregation of cellulose fiber, the lignin content in the plant fiber-containing material is about 40 mass % or less, preferably about 10 mass % or less. The lower limit of lignin is also not particularly limited, and the lower limit is preferably close to 0 mass %. The lignin content can be measured by the Klason method.

The average fiber length of the cellulose fiber is not particularly limited. However, as the average fiber length of the cellulose fiber is longer, the effect of improving the characteristics can be expected. For example, when CNF (e.g., TEMPO-oxidized CNF) obtained by defibration by chemical treatment is used as the cellulose fiber, the aspect ratio of the CNF is about 1,000 (that is, the width of the cellulose fiber is 3 nm to 5 nm, and the fiber length is about 3 μm).

(Cellulose Nanofiber)

The cellulose nanofiber (CNF) according to the present embodiment is nanofiber obtained by finely dividing a material containing cellulose fiber (e.g., a raw material of the cellulose fiber) to a nano level (defibration treatment). As the CNF according to the present embodiment, various CNFs can be used as long as they have hydroxy groups on the surface.

In addition, the method for producing the CNF is not particularly limited, and various conventionally known production methods can be employed. For example, the CNF can be prepared by defibrating raw materials of cellulose fiber (as an example, pulp or the like). In the defibrating method, first, an aqueous suspension or slurry of cellulose fiber is prepared, and the prepared aqueous suspension or slurry is mechanically ground using a refiner, a high-pressure homogenizer, a grinder, a kneader (extruder), a bead mill, or the like, so that the cellulose fiber are defibrated to prepare the CNF.

The average value (average fiber diameter) of the fiber diameters of CNF is not particularly limited. The average fiber diameter of the CNF may be about 4 nm or more and about 200 nm or less, about 150 nm or less, about 100 nm or less, or about 50 nm or less. In addition, the average value (average fiber length) of the fiber lengths of the CNF may be about 3 μm or more, about 5 μm or more, about 100 μm or less, or about 500 μm or less. The average value of fiber diameters and the average value of fiber lengths of the CNF may be, for example, average values calculated by measuring fiber diameters and fiber lengths of a predetermined number or more (e.g., 50 or more) of CNF observed in a predetermined field of view of an electron microscope.

In addition, the specific surface area of the CNF is preferably 70 $m^2$/g or more, more preferably 100 $m^2$/g or more, and preferably about 300 $m^2$/g or less, more preferably about 250 $m^2$/g or less, still more preferably about 200 $m^2$/g or less, most preferably about 150 $m^2$/g or less. For example, carboxymethyl cellulose (CMC, chemically treated CNF) as the CNF has a specific surface area of about 300 $m^2$/g. The specific surface area can be measured by the BET method.

[Polymer]

The polymer (that is, a polymer composed of a predetermined molecular chain having a reactive group) according to the present embodiment is a polymer having a reactive group capable of reacting with a hydroxy group and including a substantially nonpolar or hydrophobic molecular chain. This reactive group reacts with a hydroxy group of cellulose to form a predetermined bond, whereby the molecular chain of the polymer is bonded to cellulose. In the present embodiment, the molecular chain of the polymer may have a reactive group, and the chain length of the reactive group may not be controlled. Another structural unit may be contained in a part of the molecular chain as long as the reaction between the reactive group and the hydroxy group is not inhibited. Furthermore, the nonpolar polymer of the molecular chain may have another group different from the reactive group. The reactive group that reacts with the hydroxy group of cellulose may be at least some of the reactive groups in the polymer, and it is not always necessary that all the reactive groups and the hydroxy groups of cellulose form bonds.

(Reactive Group)

The reactive group according to the present embodiment is a group containing an oxygen atom bonded to a carbon atom and is a group that can be crosslinked by forming a predetermined bond with a hydroxy group of cellulose. The predetermined bond formed by the reaction between the hydroxy group of cellulose and the reactive group is at least one bond selected from the group consisting of an ether bond, an ester bond, an amide bond, and a urethane bond. Examples of the reactive group include at least one group selected from the group consisting of an acid anhydride group, a carbonyl group (e.g., methoxycarbonyl group), and a carboxy group. As the acid anhydride group, for example, a succinic anhydride group, a maleic anhydride group, a glutaric anhydride group, and a phthalic anhydride group are preferable, and a succinic anhydride group is more preferable from the viewpoint of easy handling.

(Molecular Chain: Nonpolar Polymer)

The nonpolar polymer is a polymer substance having no permanent dipole and is a nonpolar polymer even when it contains a permanent dipole derived from impurities mixed in a normal use situation, additives usually added, or the like. Examples of the nonpolar polymer include a polyethylene resin, a polypropylene resin, and a tetrafluoroethylene resin.

Examples of the nonpolar polymer as the molecular chain in the present embodiment include substantially nonpolar or hydrophobic olefin resins. Examples of the olefin resin include polypropylene, polyethylene, an ethylene-vinyl acetate copolymer resin, a vinyl chloride resin, a styrene resin, a (meth)acrylic resin, a vinyl ether resin, a polyamide resin, a polycarbonate resin, a polysulfone resin, a polyester resin, a polyvinyl acetal resin, a polyvinylidene chloride resin, and a polyurethane resin.

When the molecular chain is an ethylene-vinyl acetate copolymer resin, a (meth)acrylic resin, or the like, the reactive group may be a methoxycarbonyl group or the like contained in the molecular chain. In this case, the nonpolar polymer in the present embodiment refers to a molecular structure of a portion containing a methoxycarbonyl group or the like (in this case, the molecular chain refers to a structure in which a reactive group is contained in the molecular chain itself. In this case, if the molecular chain portion excluding the reactive group is nonpolar, the polymer is a nonpolar polymer). In addition, another reactive group (reactive group different from the methoxycarbonyl group) may be separately introduced into the ethylene-vinyl acetate copolymer resin, the (meth)acrylic resin, or the like by graft polymerization or the like.

The nonpolar polymer is preferably at least one nonpolar polymer selected from the group consisting of polypropylene, an ethylene-vinyl acetate copolymer resin, and an acrylic resin from the viewpoint of availability, low specific gravity, versatility, and/or processability. Among them, polypropylene is more preferable. These olefin resins may contain other copolymerizable units. These olefin resins may be used alone or in combination of two or more thereof.

(Polymer)

Examples of the polymer containing the molecular chain and the reactive group include various polymers obtained by combining the molecular chain and the reactive group.

Examples thereof include polypropylene, an ethylene-vinyl acetate copolymer resin, and an acrylic resin having at least one reactive group among the above reactive groups. As the polymer, a polymer in which the reactive group is bonded to the molecular chain like a pendant group is more preferable, and for example, a graft copolymer is preferable. Among the polymers described above, it is most preferable to use maleic anhydride-modified polypropylene (MAPP) having a maleic anhydride group as a reactive group and including a polypropylene molecular chain, from the viewpoint of being able to activate the movement of the reactive group with respect to the molecular chain.

(Molecular Weight)

The weight average molecular weight of the polymer containing the reactive group and the nonpolar polymer is preferably 5,000 or more, more preferably 10,000 or more, still more preferably 15,000 or more and is preferably 200,000 or less, more preferably 150,000 or less, still more preferably 100,000 or less. When the weight average molecular weight is less than 5,000, the mechanical properties of the cellulose complex tend to be deteriorated, and when the weight average molecular weight is more than 200,000, the reactive groups are insufficient, so that it tends to be difficult to produce a cellulose complex exhibiting desired physical properties. The weight average molecular weight can be determined in terms of polystyrene using high temperature gel permeation chromatography (high temperature GPC) and then calculated in terms of polypropylene using the Q factor.

(Grafting Ratio)

For example, when maleic anhydride is grafted to polypropylene to obtain MAPP, a polymer radical is generated on the polypropylene chain in the graft reaction, and maleic anhydride is grafted to the polymer radical. On the other hand, as a competitive reaction of the graft reaction, a molecular cleavage reaction of the polypropylene chain occurs. Here, since the molecular cleavage reaction is predominant over the graft reaction, there is a trade-off relationship between the grafting ratio and the molecular weight, such that the molecular weight of the resulting MAPP decreases when the grafting ratio increases.

When the grafting ratio is low (that is, when the graft copolymer has a high molecular weight and a low MA concentration), it is difficult to emulsify the polymer, and when the grafting ratio is high, the molecular weight of the graft copolymer extremely decreases. When the molecular weight of the graft copolymer is reduced, the molecular weight of the graft copolymer captured by the cellulose complex is also reduced, so that the properties (e.g., strength) of the cellulose complex itself may be deteriorated.

Therefore, when the polymer is a graft copolymer (e.g., in the case of MAPP), the grafting ratio is preferably 0.2% or more, more preferably 1.0% or more, from the viewpoint of facilitating the formation of an emulsion of the polymer. The grafting ratio is preferably 4.0% or less, more preferably 3.0% or less, from the viewpoint of suppressing deterioration of the properties of the cellulose complex/resin composition due to a decrease in the molecular weight of the polymer.

(Method for Calculating Grafting Ratio)

The method for calculating the grafting ratio of the graft copolymer is as follows. First, the graft copolymer is purified to prepare a sample (sample preparation step). Next, the reactive group-derived component of the sample is quantified by $^1$H-NMR measurement (step of quantifying the reactive group-derived component). In addition, the ratio of the absorbances of characteristic absorbers (e.g., the molecular chain and the reactive group) of the sample is obtained by FT-IR measurement (absorbance ratio calculation step). Then, a calibration curve is created from the quantitative value obtained by $^1$H-NMR and the absorbance ratio obtained by FT-IR (calibration curve creating step). Subsequently, the grafting ratio is calculated from the absorbance ratio obtained by FT-IR of the graft copolymer using the created calibration curve (grafting ratio calculation step).

Specifically, an example of using MAPP as the graft copolymer will be described. First, the graft copolymer is purified to prepare a sample from which noise components have been removed. The purification of MAPP is performed through the following steps as an example. First, a predetermined amount of MAPP and a predetermined amount of a first organic solvent (e.g., xylene) are charged into a recovery flask, and MAPP is dissolved by heating. Next, after the solution in which MAPP is dissolved is cooled, a predetermined amount of a second organic solvent (e.g., acetone) is added to the recovery flask to recrystallize MAPP. Then, the liquid cloudy due to recrystallization of MAPP is filtered under reduced pressure to separate solid components. Subsequently, the solid component is rinsed by adding an organic solvent (e.g., acetone) thereto. Then, the solid component after rinsing is dried under heating and reduced pressure (e.g., drying under heating and reduced pressure at 140° C. for 1 hour is performed). After completion of the drying, the obtained solid component is heat-pressed (e.g., pressed at 200° C.) to produce a transparent film (e.g., a transparent film having a thickness of about 0.1 mm) as a sample.

Next, $^1$H-NMR measurement and FT-IR measurement are performed using the prepared sample. Specifically, components derived from maleic anhydride (MA) of the sample are quantified by $^1$H-NMR. In addition, the ratio of the absorbances of the characteristic absorption bands (PP and MA) of the sample is obtained by FT-IR. Then, a calibration curve is created from the quantitative value obtained by $^1$H-NMR and the absorbance ratio obtained by FT-IR. Subsequently, using the results of the created calibration curve, the grafting ratio is calculated from the absorbance ratio obtained by FT-IR using the following equation.

$$B/A \times \text{coefficient} = \text{grafting ratio (\%)} \qquad \text{(Equation)}$$

Here, "A" is an absorbance of a polypropylene-derived methyl group at 4,240 cm$^{-1}$, and "B" is an absorbance of an antisymmetric stretching absorption of a closed-ring carbonyl at 1,865 cm$^{-1}$. The coefficient is 1.2. "B/A" is the absorbance (abs) ratio of maleic anhydride and polypropylene.

The $^1$H-NMR measurement can be performed with, for example, EX-400 manufactured by JEOL Ltd. using a sample solution obtained by putting a sample into a predetermined solution (For example, ODCB/C$_6$D$_6$=4/1) so as to have a concentration of 10% (wt/vol) and heating the solution to 130° C. FT-IR measurement can be performed using a transmission method.

(Melting Point)

The melting point of the polymer depends on the melting point of the nonpolar polymer employed in the molecular chain. For example, when a polypropylene polymer is adopted for the molecular chain, the melting point of the polymer is about 80° C. or higher and 175° C. or lower.

[Captured Polymer]

The polymer captured by the cellulose complex is the same as the polymer described above. However, the nonpolar polymer bonded to the hydroxy group of cellulose via the reactive group, that is, the polymer including the non-polar polymer having the reactive group, is the same polymer as the captured polymer.

In the present embodiment, when the cellulose complex is subjected to Soxhlet extraction, if the extracted insoluble component (extraction-insoluble component) contains the cellulose complex and the extracted soluble component (extraction-soluble component) contains the polymer, the polymer is considered to be "captured" by the cellulose complex. For example, the cellulose complex is subjected to Soxhlet extraction, and the extraction-insoluble component and the extraction-soluble component are separated. Next, for each of the extraction-insoluble component and the extraction-soluble component, FT-IR measurement, $^1$H-NMR measurement, and/or $^{13}$C-NMR measurement is performed. As a result, when peaks derived from the skeleton, bonds, and/or groups contained in the cellulose complex are observed in the extraction-insoluble component, and peaks derived from the skeleton, bonds, and/or groups contained in the polymer are observed in the extraction-soluble component, it can be assumed that the polymer is captured in the cellulose complex.

Here, a complex formed by binding MAPP to CNF is taken as an example of the cellulose complex. CNF itself is insoluble in xylene, and MAPP itself is soluble. In this case, when xylene is used as an organic solvent for Soxhlet extraction, an extraction-insoluble component and an extraction-soluble component are obtained. When the amount (wt %) of the extraction-insoluble component is larger than the amount (wt %) of CNF used for synthesis of the cellulose complex, and existence of ester bonds is confirmed by NMR measurement, it is indicated that MAPP is bonded to the CNF via the ester bonds.

Then, in this case, when a peak based on a polypropylene (PP) skeleton is observed by $^{13}$C-NMR measurement of the extraction-soluble component, a peak based on an MA skeleton is observed by FT-IR measurement and $^1$H-NMR measurement, a peak based on a cellulose skeleton is observed by $^1$H-NMR measurement, a carbonyl peak based on an MA skeleton is observed by FT-IR measurement and $^{13}$C-NMR measurement of the extraction-insoluble component, and a peak based on a cellulose skeleton is observed by $^{13}$C-NMR measurement, it can be assumed that a polymer is captured by the cellulose complex.

<Cellulose Complex/Resin Composition>

The cellulose complex/resin composition according to the present embodiment is a composition obtained by dispersing the cellulose complex in a predetermined nonpolar resin. Since the cellulose complex is in a state in which the nonpolar polymer is bonded to cellulose, the cellulose complex can be substantially uniformly dispersed in the nonpolar resin. When the polymer captured by the cellulose complex is present, the cellulose complex can be more easily dispersed in the nonpolar resin.

[Resin]

As the resin in the cellulose complex/resin composition, various resins can be used. Examples of the resin include a thermoplastic resin, a thermosetting resin, and/or a photocurable resin. As the resin in the cellulose complex/resin composition, a nonpolar or hydrophobic resin is preferably used.

Examples of the thermoplastic resin include a styrene resin, an acrylic resin, an aromatic polycarbonate resin, an aliphatic polycarbonate resin, an aromatic polyester resin, an aliphatic polyester resin, an olefin resin (e.g., aliphatic polyolefin resin and cyclic olefin resin), a polyamide resin, a polyphenylene ether resin, a thermoplastic polyimide resin, a polyacetal resin, a polysulfone resin, and an amorphous fluorine resin.

Examples of the thermosetting resin include an epoxy resin, an acrylic resin, an oxetane resin, a phenol resin, a urea resin, a polyimide resin, a melamine resin, an unsaturated polyester resin, a silicone resin, a polyurethane resin, an allyl ester resin, and a diallyl phthalate resin.

Examples of the photocurable resin include an epoxy resin, an acrylic resin, and an oxetane resin.

As the resin, it is preferable to use a thermoplastic resin, such as an olefin resin (polypropylene or the like), from the viewpoint of being applicable to various industries and being relatively easy to mold.

[Other Additives]

Various additives such as an extender, a plasticizer, a moisture absorbent, a physical property adjusting agent, a reinforcing agent, a colorant, a flame retardant, an antioxidant, an anti-aging agent, a conductive agent, an antistatic agent, an ultraviolet absorber, an ultraviolet dispersant, a solvent, a perfume, a deodorant, a pigment, a dye, a filler, and a diluent may be added to the cellulose complex and/or the cellulose complex/resin composition according to the present embodiment as necessary within a range in which physical properties and the like of the cellulose complex and/or the cellulose complex/resin composition are not impaired.

[Field of Application: Product]

The cellulose complex/resin composition according to the present embodiment can be used for various applications. Specifically, it can be used for various products such as automobile parts, home electric appliances, houses and building materials, and packaging materials.

<Method for Producing Cellulose Complex>

A production method for the cellulose complex according to the present embodiment roughly includes the following steps. That is, the production method for the cellulose complex includes a mixing step of mixing cellulose having a hydroxy group and a polymer having a reactive group to prepare a mixture, and a step of bonding the hydroxy group and the reactive group (bonding step). The bonding step may be a heating step of heating the mixture. The production method for the cellulose complex may further include a drying step of drying the cellulose complex obtained after the heating step. The heating step can be performed after the mixing step, or the mixing step and the heating step can be performed simultaneously (the mixing step can be executed while heating is performed).

[Mixing Step]

First, a mixture is prepared by mixing cellulose having a hydroxy group, that is, a predetermined amount of cellulose fiber and/or cellulose nanofiber (CNF), and a predetermined amount of polymer (that is, a polymer having a reactive group capable of reacting with the hydroxy group and including a nonpolar polymer as a molecular chain). The mixing method is not particularly limited, and manual mixing, mixing using a stirrer or a mixer, or the like can be appropriately selected.

(Cellulose Used for Mixing)

Here, when cellulose fiber is used as cellulose, the cellulose fiber is used in a state of containing water. When CNF is used as cellulose, it is preferable to use an aqueous dispersion of cellulose, that is, an aqueous dispersion of CNF (hereinafter referred to as a "CNF aqueous dispersion"). As the CNF in the CNF aqueous dispersion, the above various CNF can be used. Cellulose fiber that has been hydrophobized in advance by chemical treatment can also be used. However, when the cellulose fiber is hydrophobized in advance by chemical treatment, processes such as purification accompanying the chemical treatment is additionally required, and thus cost and effort increase. On the other hand, in the present embodiment, since chemically untreated cellulose fiber and/or an aqueous dispersion of cellulose can be used, it is not necessary to go through the above steps, which is very advantageous in terms of cost and the like.

The amount of moisture contained in the cellulose fiber varies depending on the method for producing the cellulose fiber. For example, methods for producing cellulose fiber include mechanical defibration in which cellulose is defibrated to a fiber width of about several tens to 200 nm level using a grinder or ultra-high pressure water, and chemical defibration in which cellulose is defibrated to a fiber width of about 10 nm level by TEMPO oxidation, phosphoric acid esterification, or the like. In the case of mechanical defibration, heat is generated, and in the case of chemical defibration, chemical treatment in an aqueous solution is required, and thus both are water dispersions. In the case of mechanical defibration, the solid content concentration of cellulose fiber is usually about 2 wt % or more and 10 wt % or less (when the content is about 10 wt %, the shape of the cellulose fiber becomes a sherbet shape) although it varies depending on the degree of defibration. On the other hand, in the case of chemical defibration, the solid content concentration of cellulose fiber is about 0.5 wt % or more and 2 wt % or less (note that 2 wt % is the upper limit of the solid content concentration required for maintaining a gel state). The present embodiment is advantageous in that the present embodiment can be applied not only to the aqueous dispersion CNF but also to fiber such as pulp.

The solid content concentration of the CNF aqueous dispersion is preferably a concentration that achieves a viscosity at a level at which stirring can be performed without temperature unevenness when mixed with a polymer emulsion. For example, the solid content concentration of the CNF aqueous dispersion is 0.5 wt % or more, preferably 2 wt % or more, may be 5 wt % or more, and is 15 wt % or less, preferably 10 wt % or less, from the viewpoint of facilitating mixing with the polymer. The viscosity (e.g., a representative value of the viscosity measured at 25° C. and 60 rpm using a B-type viscometer) of the CNF aqueous dispersion is 700 mPa·s or more, may be 3,000 mPa·s or more, may be 6,000 mPa·s or more, may be 40,000 mPa·s or more, is 130,000 mPa·s or less, and is preferably 110,000 mPa·s or less.

(Polymer Used for Mixing)

As the polymer used in the mixing step, an aqueous emulsion of a polymer in which polymer fine particles are dispersed in water is preferably used. As the polymer constituting the aqueous emulsion of a polymer, the above-described various polymers can be used. A system (emulsion) in which polymer fine particles (dispersoid) are stably dispersed in water (dispersion medium) is referred to as "latex". However, in the present embodiment, such a system is referred to as an "emulsion" according to common practice.

The proportion of the solid content in the aqueous emulsion of the polymer is 5 wt % or more, preferably 10 wt % or more, more preferably 15 wt % or more, still more preferably 20 wt % or more, and may be 25 wt % or more from the viewpoint of reactivity with cellulose. In addition, the ratio of the solid content in the aqueous emulsion of the polymer is 45 wt % or less, preferably 30 wt % or less, from the viewpoint of facilitating preparation of the emulsion.

As the aqueous emulsion of the polymer, various emulsions can be used. Among various emulsions, it is preferable to use a maleic anhydride-modified polypropylene (MAPP) emulsion, an ethylene-vinyl acetate copolymer resin (EVA) emulsion, and an acrylic emulsion of an acrylic resin. Among them, a MAPP emulsion in which the reactive group hangs from the molecular chain, therefore the reactive group easily approaches the hydroxy group of cellulose, and the frequency of collision of the reactive group with the hydroxy group can be improved is most preferable. By mixing the aqueous dispersion of cellulose and the aqueous emulsion of the polymer, mixing at a molecular level at a low temperature or with less thermal degradation is facilitated as compared with the case of mixing solids.

(Mixed Amounts of Cellulose and Polymer)

The mixing ratio of cellulose and the polymer can be defined by the solid content ratio of cellulose and the polymer. That is, the solid content ratio of cellulose (cellulose fiber or CNF) in the mixture is 3 wt % or more, may be 5 wt % or more, preferably 10 wt % or more, and may be 20 wt % or more, and is 50 wt % or less, preferably 40 wt % or less, from the viewpoint of suppressing aggregation of cellulose (typically, CNF) and appropriately forming a complex with the polymer.

On the other hand, the solid content ratio of the polymer of the mixture is a ratio equal to or higher than the solid content ratio of cellulose, preferably a higher ratio, and is, for example, 10 wt % or more, and may be 15 wt % or more, 25 wt % or more, or 45 wt % or more.

Therefore, when cellulose fiber and/or CNF and the polymer are mixed, cellulose (cellulose fiber containing water or CNF aqueous dispersion) and the polymer (aqueous emulsion of the polymer) are weighed and mixed so that the ratio of the solid content ratio of cellulose to the solid content ratio of the polymer in the mixture, that is, the solid content ratio of cellulose:the solid content ratio of the polymer is 1:x (where $x \geq 1$), typically about 1:1 to 1:10, preferably about 1:2 to 1:9.

[Bonding Step]

The bonding step is a step of bonding the hydroxy group of cellulose and the reactive group of the polymer. The bonding step may be, for example, a heating step of heating a mixture of cellulose having a hydroxy group and the polymer having the reactive group and including a nonpolar polymer as a molecular chain while controlling the mixture such that its temperature does not exceed predetermined temperature. In addition, the bonding step may be a step of adding cellulose having a hydroxy group to an aqueous emulsion of the polymer in which polymer fine particles are dispersed in water and then heating the mixture (or heating while adding cellulose).

[Heating Step]

In the heating step, the mixture obtained in the mixing step is controlled to a predetermined temperature or lower and heated for a predetermined time. By this heating step, the hydroxy group of cellulose reacts with the reactive group of the polymer to form a predetermined bond, and the polymer is bonded to cellulose via the bond. Here, when the reactive group is at least one reactive group selected from the group consisting of a succinic anhydride group, a carbonyl group, and a carboxy group, the bond formed by the hydroxy group of cellulose and the reactive group is an ester bond. That is, in this case, an esterification reaction proceeds in the heating step.

The reaction temperature in the heating step is 50° C. or higher from the viewpoint of enabling formation of a predetermined bond (e.g., an ester bond), is preferably 70°

C. or higher from the viewpoint of improving reactivity, and may be 80° C. or higher from the viewpoint of further improving reactivity. In addition, the reaction temperature is 200° C. or lower in order to suppress thermal deterioration of cellulose, is preferably 160° C. or lower from the viewpoint of facilitating temperature control, and may be 145° C. or lower from the viewpoint of facilitating quality control.

In the heating step, the mixture is preferably heated under reduced pressure. The pressure during heating is less than normal pressure. For example, the pressure in the heating step may be about 0.09 MPa or less. Heating under reduced pressure facilitates removal of moisture from the system. After the heating step, a cellulose complex powder is obtained. The reaction product obtained after the heating step may be subjected to vacuum filtration (vacuum filtration step). That is, the reaction product according to the present embodiment can be subjected to a dehydration treatment. The reaction product can be subjected to a strong dehydration treatment by undergoing the vacuum filtration step. In the heating step, for example, an apparatus such as a planetary stirring type heating and vacuum drying apparatus can be used. In addition, the heating step may include a step (primary dehydration step) of subjecting the mixture to a heating reaction in a normal pressure open system pot and then to a primary dehydration treatment with a centrifuge, a filter press, or the like and a step (secondary dehydration step) of subsequently performing drying under reduced pressure using a dryer in which a shearing force is applied. From the viewpoint of the amount of the powder of the obtained cellulose complex and/or the production cost, the heating step is preferably a step in which the primary dehydration treatment step and the secondary dehydration treatment step are combined.

Here, the cellulose complex contains the polymer captured by the cellulose complex. It is presumed that by using cellulose (cellulose fiber containing water or CNF aqueous dispersion) and an aqueous emulsion of the polymer, not only the cellulose complex is formed, but also the polymer is easily entangled with the nonpolar polymer bonded to the cellulose, so that the polymer is easily captured by the cellulose complex.

[Drying Step]

In the drying step, moisture remaining in the cellulose complex obtained after the heating step is dried. For example, the drying step is a step of drying the cellulose complex with warm air. The temperature of the warm air is, for example, about 80° C., and the drying time is about 8 hours. However, the temperature and the drying time are not limited thereto as long as the thermal deterioration of cellulose contained in the cellulose complex can be suppressed. In the drying step, for example, it is preferable to continue drying until the amount of moisture contained in the cellulose complex becomes about 5 wt % or less.

<Production Method for Cellulose Complex/Resin Composition>

The cellulose complex/resin composition can be adjusted through a kneading step of kneading the cellulose complex obtained above with a predetermined nonpolar resin at a predetermined temperature for a predetermined time. After the kneading step, a curing step of curing the obtained cellulose complex/resin composition may be further performed.

[Kneading Step]

The kneading step is a step of kneading the cellulose complex and a predetermined nonpolar resin under a predetermined temperature environment, and the kneading method is not particularly limited. The kneading can be performed in one step or divided into a plurality of steps. The kneading step can be performed using, for example, a kneader, a twin-screw kneader, and/or an injection molding machine, which are devices for kneading materials introduced by rotating a blade in a container. The cellulose complex used in the kneading step may be in a powder form or in a pellet form from the viewpoint of ease of handling at the time of compounding. On the other hand, the shape of the nonpolar resin is not particularly limited and may be a pellet or a powder.

(Amounts of Cellulose Complex and Resin)

The amount of the cellulose complex added to the resin is not particularly limited. For example, when the solid content ratio of the cellulose complex in the cellulose complex/resin composition is a (wt %) and the solid content ratio of the resin is b (wt %), the resin and the cellulose complex weighed so that a:b is a ratio of about 1:1 to 1:9, preferably 1:2 to 1:5, can be kneaded. The cellulose (CNF) content of the cellulose complex is preferably 5 wt % or more, more preferably 10 wt % or more, still more preferably 15 wt % or more, still more preferably 20 wt % or more, and is preferably 40 wt % or less, more preferably 35 wt % or less, still more preferably 30 wt % or less. The content of cellulose (CNF) in the cellulose complex/resin composition is preferably 2 wt % or more, more preferably 3 wt % or more, and is preferably 15 wt % or less, more preferably 10 wt % or less, still more preferably 5 wt % or less, from the viewpoint of securing the mechanical properties, raw material cost, and the like.

(Temperature During Kneading)

Further, in the kneading step, it is preferable to execute kneading while heating. From the viewpoint of melting the resin and dispersing the cellulose complex in the molten resin (that is, the cellulose complex is added to the melt of the resin), the heating temperature at the time of kneading is preferably controlled to a temperature equal to or higher than the temperature at which the resin melts and equal to or lower than the temperature at which cellulose contained in the cellulose complex is less likely to be thermally deteriorated. Specifically, when a polypropylene resin is used as the nonpolar resin to be used for kneading, for example, the nonpolar resin, the kneading step is preferably controlled to a heating temperature of 175° C. or higher, and preferably controlled to a heating temperature of 190° C. or 220° C. or lower from the viewpoint of bringing the resin into a molten state and not applying excessive heat to the cellulose complex.

In the kneading step, for example, it is preferable to first melt the resin using a twin-screw extruder or the like, add the cellulose complex to the molten resin, and knead the resin. By adopting such an order, heat (heat quantity) applied to the cellulose complex can be reduced, and thermal deterioration of cellulose contained in the cellulose complex can be suppressed.

In the cellulose complex/resin composition obtained through the kneading step, the cellulose complex is substantially uniformly dispersed in the resin. This dispersion state can be confirmed by, for example, an infrared imaging method, three-dimensional TEM, or the like.

Effects of Embodiment

In the cellulose complex according to the present embodiment, since the nonpolar polymer is bonded to the hydroxy group of cellulose via the reactive group, when the cellulose complex is added to the nonpolar resin, the cellulose complex can be substantially uniformly dispersed in the resin without adding a compatibilizer (dispersant). Therefore, with the cellulose complex according to the present embodiment, for example, since the cellulose resin and/or CNF can be uniformly dispersed in an olefin resin such as polyethylene and polypropylene, a high-performance structural material can be produced while reducing the raw material cost and the manufacturing facility cost.

In addition, since the cellulose complex employs an aqueous dispersion of cellulose and an aqueous emulsion of the polymer, the cellulose complex can be prepared while suppressing thermal degradation of cellulose. As a result, the cellulose complex/resin composition can exhibit characteristics to which the original characteristics of cellulose are added.

Furthermore, the cellulose complex can be prepared in a state of capturing the polymer used for preparing the cellulose complex. Thus, when the cellulose complex according to the present embodiment is added to the nonpolar resin, the cellulose complex is more easily dispersed in the resin.

EXAMPLES

More specific description will be given with reference to examples. It goes without saying that these examples are illustrative and should not be construed in a limited manner.

Examples 1 and 2: Cellulose Complex

First, each of the blended substances was mixed at a blending ratio shown in Table 1 to obtain a mixture. Subsequently, the resulting mixture was heated under reduced pressure using a vertical kneading/stirring machine (Trimix TX-15, manufactured by INOUE MFG., INC.). The vacuum heating conditions were set to a set temperature of 145° C., a heating time of 30 minutes, and an internal pressure of 0.09 MPa. Thereby, a powder of a cellulose complex (hereinafter referred to as "CNFem") according to Example 1 was prepared. Subsequently, the obtained powder of CNFem according to Example 1 was dried using a warm air dryer. The drying conditions were set to 80° C. and 8 hours. CNFem according to Example 2 was prepared in the same manner.

TABLE 1

| Blended substance | Example 1 | Example 2 |
|---|---|---|
| CNF slurry | 15 | 40 |
| MAPP in MAPP emulsion | 85 | 60 |

In Table 1, the unit of the blending amount of each blended substance is "wt %". The details of the blended substances are as follows.

Cellulose nanofiber (CNF) slurry (BiNFi-s WFo-10010: solid content 10%, manufactured by Sugino Machine Limited)

MAPP emulsion (aqueous emulsion of maleic anhydride-modified polypropylene (MAPP): prepared to have a solid content of 25% using water)

In Table 1, the blending amount of the CNF slurry is represented by the amount of CNF contained in the CNF slurry, and the blending amount of the MAPP emulsion is represented by the amount of MAPP contained in the MAPP emulsion. In addition, CNFem according to Example 1 is a sample with a solid content ratio of CNF:MAPP=1:5.7, and CNFem according to Example 2 is a sample with a solid content ratio of CNF:MAPP=1:1.5. In the following measurement, the measurement results of Example 1 are shown, but similar measurement results were obtained in Example 2.

(Nuclear Magnetic Resonance (NMR) Spectroscopy Measurement)

CNFem according to Example 1 was refluxed in xylene to obtain a portion soluble in xylene (hereinafter referred to as a "soluble portion") and a portion insoluble in xylene (hereinafter referred to as an "insoluble portion"). Then, the dried product of the soluble portion was subjected to $^1$H-NMR and $^{13}$C-NMR measurements using a Fourier transform nuclear magnetic resonance apparatus (JNM-EX400 manufactured by JEOL Ltd.). As a measurement solvent, a mixed solvent of ortho-dichlorobenzene and benzene was used. The dried product of the insoluble portion was subjected to $^{13}$C-NMR measurement using a Fourier transform nuclear magnetic resonance apparatus (JNM-ECA400 manufactured by JEOL Ltd.).

As a result, first, from the $^{13}$C-NMR spectrum of the soluble portion, signals attributed to the α-carbon were observed at around 46.5 to 44.3 ppm, signals attributed to the methine group were observed at around 28.9 to 26.7 ppm, and signals attributed to the methyl group of polypropylene (PP) were observed at around 21.8 to 20.5 ppm. Therefore, it was shown that polypropylene was present in the soluble portion.

In addition, from the $^1$H-NMR spectrum of the soluble portion, signals attributed to succinic anhydride, which is a structure in the case where maleic anhydride (MA) is bonded to polypropylene, were observed at around 2.6 ppm and 3 ppm, signals attributed to hydrogen bonded to the carbon at positions 3 to 6 of cellulose were observed at around 3.5 ppm, and signals attributed to hydrogen bonded to the carbon at position 2 of cellulose were observed at around 3.1 ppm. Therefore, it was shown that CNF, which is insoluble in xylene as a simple substance, was dissolved in the soluble portion.

On the other hand, from the solid $^{13}$C-NMR spectrum of the insoluble portion, signals attributed to the carbon at position 1 of cellulose were observed at around 100 to 105 ppm, signals attributed to the carbon at position 4 of cellulose were observed at around 79 to 86 ppm, signals attributed to the carbons at positions 2, 3, and 5 of cellulose were observed at around 70 to 80 ppm, and signals attributed to the carbon at position 6 of cellulose were observed at around 60 to 65 ppm. Therefore, it was shown that cellulose was present in the insoluble portion.

Furthermore, from the solid $^{13}$C-NMR spectrum of the insoluble portion, signals attributed to the α-carbon were observed at around 44.3 to 46.5 ppm, signals attributed to the methine group were observed at around 26.7 to 28.9 ppm, and signals attributed to the methyl group of polypropylene (PP) were observed at around 20.5 to 21.8 ppm. Therefore, it was shown that MAPP or PP was present in the insoluble portion. In addition, signals attributed to the ester carbonyl were observed at around 175 ppm. The ester carbonyl is a bond (ester bond) between the CNF and MAPP. Therefore, since polypropylene soluble in xylene as a simple substance was present in the insoluble portion and the ester carbonyl (bond between MAPP and cellulose) was observed, it was shown that there was a bond between MAPP and the CNF (that is, MAPP is bonded to the CNF).

(Infrared Spectroscopic Analysis)

The soluble portion and the insoluble portion used in the NMR spectroscopic measurement were measured by the total reflection measurement method (ATR method) using a Fourier transform infrared spectrometer (FT/IR-4200 type A, manufactured by JASCO Corporation). The measurement conditions were as follows: the measurement range of the infrared absorption spectrum: 400 to 4,000 $cm^{-1}$, the resolution: 4 $cm^{-1}$, and the number of integrations: 32.

As a result, first, absorption peaks attributed to C—H, —CH$_2$—, and —CH$_3$ stretching vibrations were observed at 2,957 to 2,920 $cm^{-1}$ in the IR spectrum of the soluble portion. In addition, an absorption peak attributed to —CH$_3$ stretching vibration was observed at around 1,376 $cm^{-1}$. Furthermore, an absorption peak attributed to stretching vibration of the carbonyl group (C═O) was observed at around 1,730 to 1,732 $cm^{-1}$. Therefore, it was shown that PP was present in the soluble portion, and the ester carbonyl was present.

In the IR spectrum of the insoluble portion, an absorption peak attributed to stretching vibration of the hydroxy group was observed at about 3,348 $cm^{-1}$, and a plurality of absorption peaks attributed to C—O—C and C—O stretching vibration of the glucose skeleton were observed at about 1,034 to 1,161 $cm^{-1}$. These peaks indicate that cellulose is contained in the insoluble portion. In addition, an absorption peak attributed to stretching vibration of the carbonyl group (C═O) was observed at around 1,730 to 1,732 $cm^{-1}$. Therefore, it was shown that the ester carbonyl was present in the insoluble portion.

From the above, the presence of the ester carbonyl was confirmed in both the soluble portion and the insoluble portion, and since the ester carbonyl is a bond formed between the CNF and MAPP, it was shown that the CNF and MAPP were bonded together (that is, the cellulose complex existed in both the soluble portion and the insoluble portion).

It is assumed that the fact that CNFem contained the soluble portion soluble in xylene and the insoluble portion insoluble in xylene was caused by the amount of MAPP captured by CNFem. That is, it is assumed that the amount of MAPP captured by CNFem in the soluble portion and the amount of MAPP captured by CNFem in the insoluble portion may be different.

In addition, when the CNF that is originally insoluble in an organic solvent was contained in the filtrate obtained by dissolving the cellulose complex capturing MAPP as described above in an organic solvent (e.g., xylene and toluene) and filtering the solution, and a component derived from PP that is originally soluble in an organic solvent was contained in the insoluble portion, it can be assumed that the cellulose complex was produced by the production method described in the present embodiment.

Example 3, Comparative Examples 1 to 4: Cellulose Complex/Resin Composition

The blended substances were mixed at a blending ratio shown in Table 2 to produce a cellulose complex/resin composition having a CNF content of 5 wt %. Subsequently, the produced cellulose complex/resin composition and polypropylene were mixed at a blending ratio such that the CNF content was 3 wt %, thereby producing a cellulose complex/resin composition according to Example 3.

Specifically, first, pellet-shaped polypropylene (PP) (J107G manufactured by Prime Polymer Co., Ltd.) was kneaded at 190° C. and a screw rotation speed of 30 rpm for 3 minutes using Labo Plastomill 10M100 (manufactured by Toyo Seiki Seisaku-sho, Ltd.), and after confirming a state in which PP was molten, a predetermined amount of CNFem according to Example 1 was added and melt-kneaded for 5 minutes. Subsequently, this sample obtained by melting and kneading was cooled and then pulverized using a cutting mill P-15 (manufactured by Fritsch Japan Co., Ltd.). As a result, a sample (sample 1) having a CNF content of 5 wt % was obtained.

TABLE 2

|  | Sample 1 | Sample 2 | Sample 3 | Sample 4 | Sample 5 |
|---|---|---|---|---|---|
| CNFem | 33.3 | — | — | — | — |
| CNF powder | — | — | 5 | 5 | — |
| MAPP | — | — | 28.3 | — | 28.3 |
| PP pellet | 66.7 | 100 | 66.7 | 95 | 71.7 |
| CNF content (wt %) | 5 | 0 | 5 | 5 | 0 |

Next, sample 1 in which the CNF content was adjusted to 5 wt % with Labo Plastomill so that the CNF content after kneading was 3 wt % and pellet-shaped PP (J107G manufactured by Prime Polymer Co., Ltd.) were mixed to provide a dry blend. Then, the temperature of the kneading zone of a twin-screw extruder (KZW20TW-45MG-NH-1100-SKG: manufactured by Technovel Corporation) was set to 190° C., the rotation speed was set to 200 rpm, and the dry blend was introduced from a hopper. The extruded strand was air-cooled on a conveyor, then passed through a water bath, and pelletized with a pelletizer. The produced pellets were dried in a dryer set at 70° C. for 3 days. As a result, the cellulose complex/resin composition according to Example 3 prepared to have a CNF content of 3 wt % was obtained.

Cellulose complex/resin compositions according to Comparative Examples 1 to 4 were also prepared in the same manner as in Example 3. However, Comparative Example 1 is a sample using only PP (prepared using sample 2), Comparative Example 2 is a sample using CNF powder and MAPP instead of CNFem (prepared using sample 3), Comparative Example 3 is a sample using CNF powder instead of CNFem (prepared using sample 4), and Comparative Example 4 is a sample using MAPP without using CNFem or CNF powder (prepared using sample 5). The CNF content of each of the samples according to Example 3 and Comparative Examples 1 to 4 is shown in Table 3. As CNF powder, "BiNFi-s WFo-UNDP" (manufactured by Sugino Machine Limited) was used, and as MAPP, "KAYABRID 003PP" (manufactured by Kayaku Nouryon Corporation) was used.

(Preparation of Test Piece)

Physical property tests of the cellulose complex/resin composition according to Example 3 and the samples according to Comparative Examples 1 to 4 will be described below. In the physical property test, a test piece was produced in accordance with JIS K 6921-2 using each of the cellulose complex/resin composition according to Example 3 and the samples according to Comparative Examples 1 to 4, and the prepared test piece was used. Specifically, each test piece was produced by subjecting a sample to a preliminary drying treatment at 80° C. for 4 hours and injection molding using an injection molding machine FE80S12ASE (manufactured by NISSEI PLASTIC INDUSTRIAL CO., LTD.) using an ISO multi-purpose type A as a mold. Here, the molten resin temperature was set to 200° C., the cylinder set temperature was set to 175° C. to 195° C., the mold temperature was set to 40° C., the average injection speed was set to 200±20 (mm/s), and the screw rotation speed was set to 110 (rpm).

For each of the samples according to Example 3 and Comparative Examples 1 to 4, a predetermined number of tensile test pieces (test piece shape: 1A shape) for a tensile test, a predetermined number of bending test pieces (test piece shape: 80 mm×10 mm×4 mm (cut from the parallel part of the 1A dumbbell)) for a bending test, and a predetermined number of Charpy impact test pieces (no notch) (test piece shape: 80 mm×10 mm×4 mm (cut from the parallel part of the 1A dumbbell)) for an impact test were produced.

(Tensile Test)

The tensile test was performed in accordance with JIS K 7161-1 and 2 using Strograph APII (manufactured by Toyo Seiki Seisaku-sho, Ltd.) as a test apparatus at a test speed of 50 mm/min, a gauge length of 50 mm, a chuck distance of 115 mm, a test temperature and humidity of 23° C. and 50% RH, and the number of tests n=5.

(Bending Test)

The bending test was performed in accordance with JIS K 7171 using Bendograph II (manufactured by Toyo Seiki Seisaku-sho, Ltd.) as a test apparatus at a test speed of 2 mm/min, a test temperature and humidity of 23° C. and 50% RH, a span interval of 64 mm, a radius of an indenter and a support base of 5.0 mm, and the number of tests n=5.

(Impact Test)

The Charpy impact test was performed in accordance with JIS K 7111-1 using a digital impact tester (manufactured by Toyo Seiki Seisaku-sho, Ltd.) as a test apparatus, with the impact direction set to edgewise, the test temperature and humidity set to 23° C. and 50% RH, the hammer weight set to 15 J, and the number of tests n=10.

The test results are shown in Table 3.

(Sem Observation)

SEM observation was performed on each of the sample according to Example 3 and the samples according to Comparative Examples 2 and 3. Specifically, in order to observe the dispersion state of the CNF in a sample, a sample was produced with a focused ion beam (FIB) apparatus and observed by SEM.

For the SEM observation sample, the test piece produced as described above was cut into a predetermined size, Pt coating was applied to the surface of the sample by sputtering, carbon was then deposited in a thickness of about 1 μm on a portion to be processed in the FIB apparatus, and a cross-sectional SEM sample was produced by cross-sectional processing. For the FIB processing, an XVision 200 TB focused ion beam apparatus (acceleration voltage 30 kV) manufactured by SII Nanotechnology Inc. was used. For SEM observation, a field emission scanning electron microscope (acceleration voltage: 3 kV) manufactured by ZEISS was used.

Figure 4:
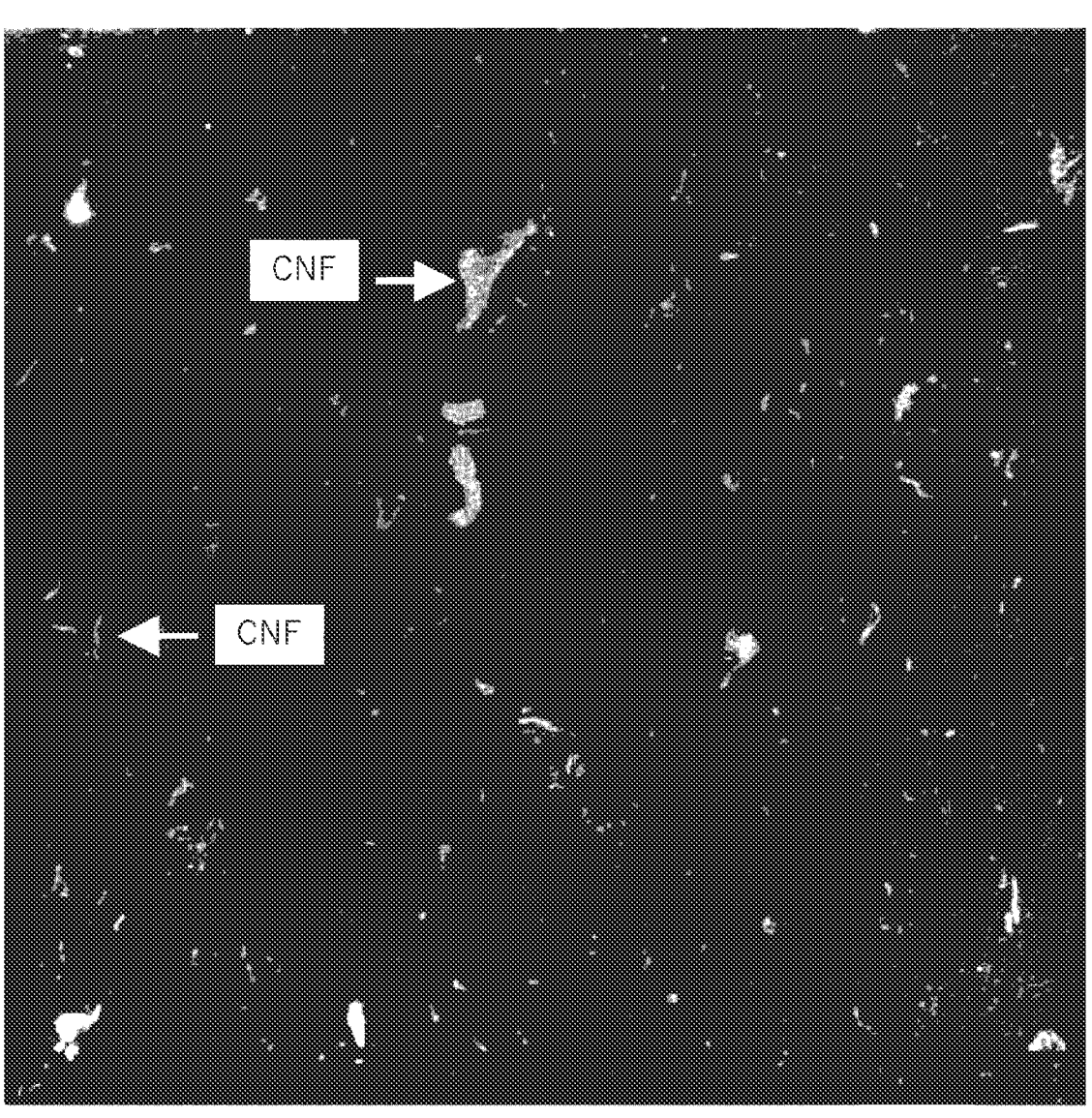
FIG. 4 shows a SEM observation result of a sample according to Example 3.
Figure 5:
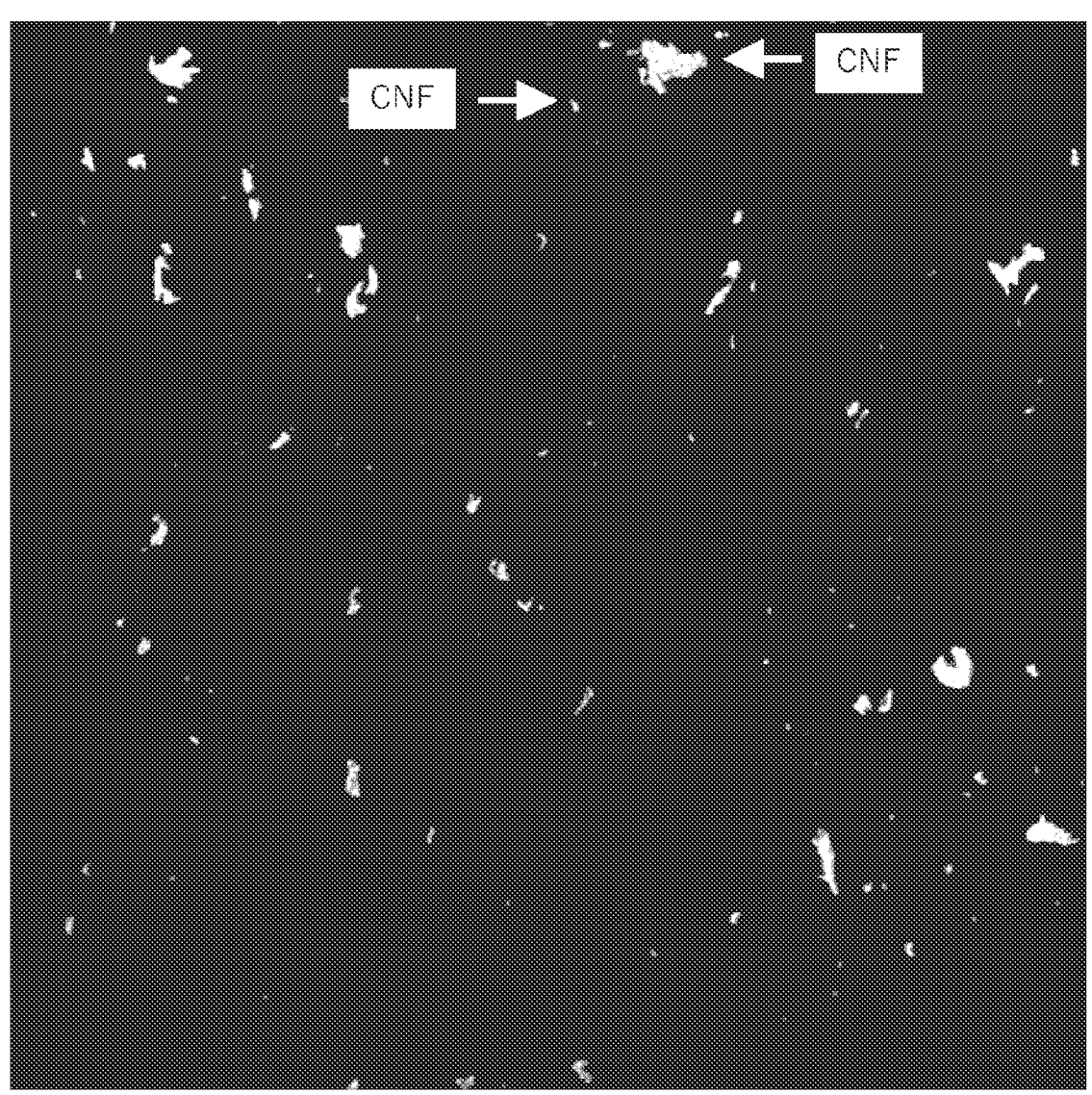
FIG. 5 shows a SEM observation result of a sample according to Comparative Example 2.

FIG. 4 shows a cross-sectional SEM image of the sample according to Example 3. Contrasts assumed to be CNF were observed in the sample. The sizes of the observed CNFs were about 10 μm or less, and many relatively small CNFs of 1 μm or less were observed. FIG. 5 shows a cross-sectional SEM image of the sample according to Comparative Example 2. Contrasts assumed to be CNF were observed in the sample. The sizes of the observed CNFs were about 0.5 to 10 μm. Further, FIG. 6 shows a cross-

TABLE 3

|  |  | Example 3 | Comparative Example 1 | Comparative Example 2 | Comparative Example 3 | Comparative Example 4 |
|---|---|---|---|---|---|---|
| Blended substance | CNFem | 33.3 | — | — | — | — |
|  | CNF powder | — | — | 5 | 5 | — |
|  | MAPP | — | — | 28.3 | — | 28.3 |
|  | PP pellet | 66.7 | 100 | 66.7 | 95 | 71.7 |
|  | CNF content (wt %) | 3 | 0 | 3 | 3 | 0 |
| Tensile test | Tensile stress at yield (MPa) | 39.7 | 33.8 | 36.0 | 34.1 | 36.1 |
|  | Tensile stress at break (MPa) | 37.6 | 15.9 | 33.9 | 27.3 | 31.2 |
|  | Tensile strain at break (%) | 11 | 100 | 10 | 20 | 16 |
|  | Nominal tensile strain at break (%) | 9.3 | 88 | 9.2 | 18 | 1.4 |
| Bending test | Flexural strength (MPa) | 52.9 | 42.3 | 48.6 | 46.9 | 46.7 |
|  | Flexural modulus (MPa) | 2030 | 1480 | 1770 | 1740 | 1670 |
|  | Flexural strain at flexural strength (%) | 6.7 | 7.3 | 6.9 | 6.9 | 7.1 |
| Impact test | Charpy impact strength (23° C.) (kJ/m$^2$) | 57 | 83 | 44 | 41 | 65 |

(Micro-X-Ray CT Observation)

Figure 1:
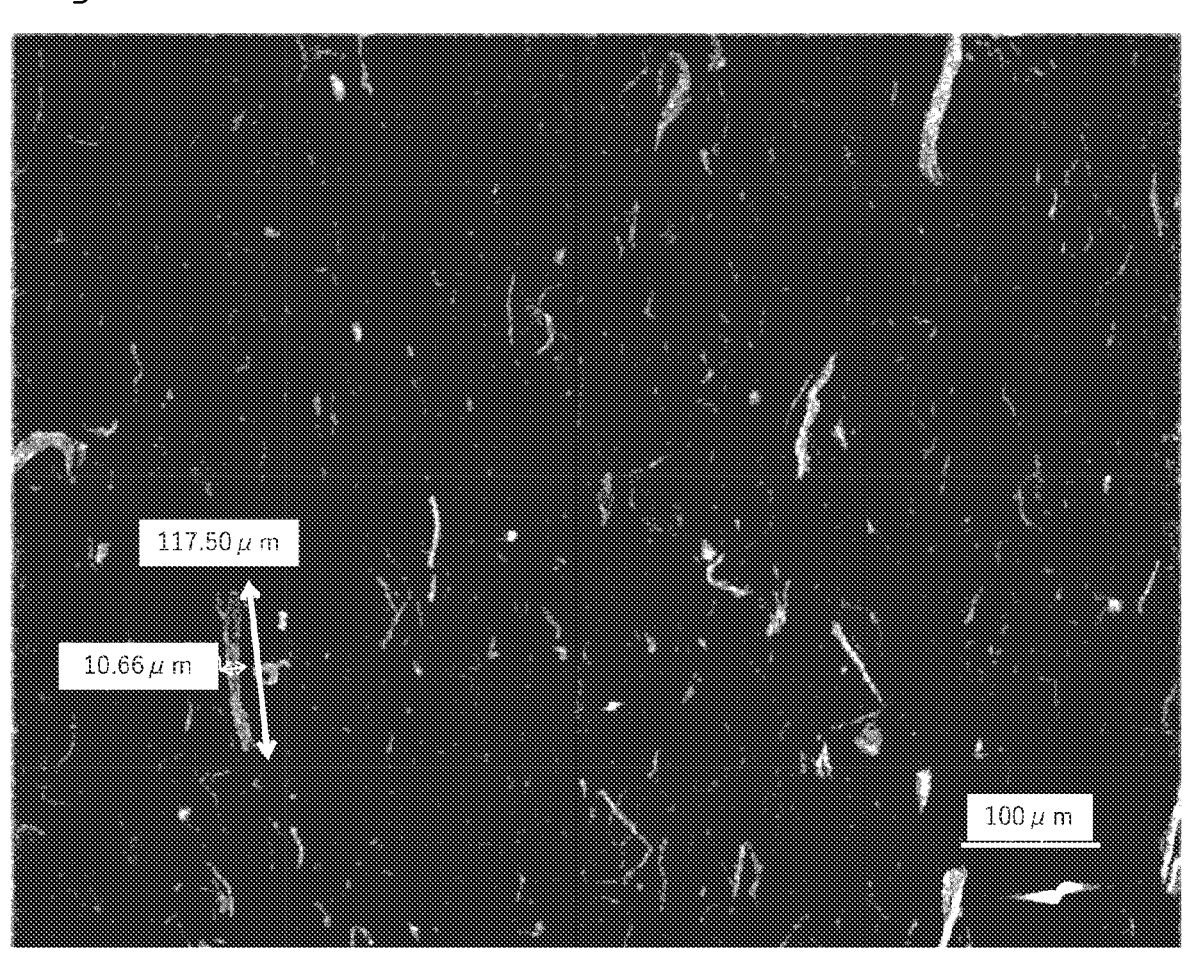
FIG. 1 shows a micro-X-ray CT observation result of a sample according to Example 3.

Micro-X-ray CT observation was performed on each of the sample according to Example 3 and the samples according to Comparative Examples 2 and 3. Specifically, an X-ray analysis microscope nano3DX (manufactured by Rigaku Corporation) was used as a test apparatus, a high magnification lens (L0270) was used as a lens, and Cu (40 kV, 30 mA) was used as an X-ray source (target). The resolution was 0.825 μm/pixel. FIG. 1 shows an observation result of the sample according to Example 3, FIG. 2 shows an observation result of the sample according to Comparative Example 2, and FIG. 3 shows an observation result of the sample according to Comparative Example 3.

Figure 2:
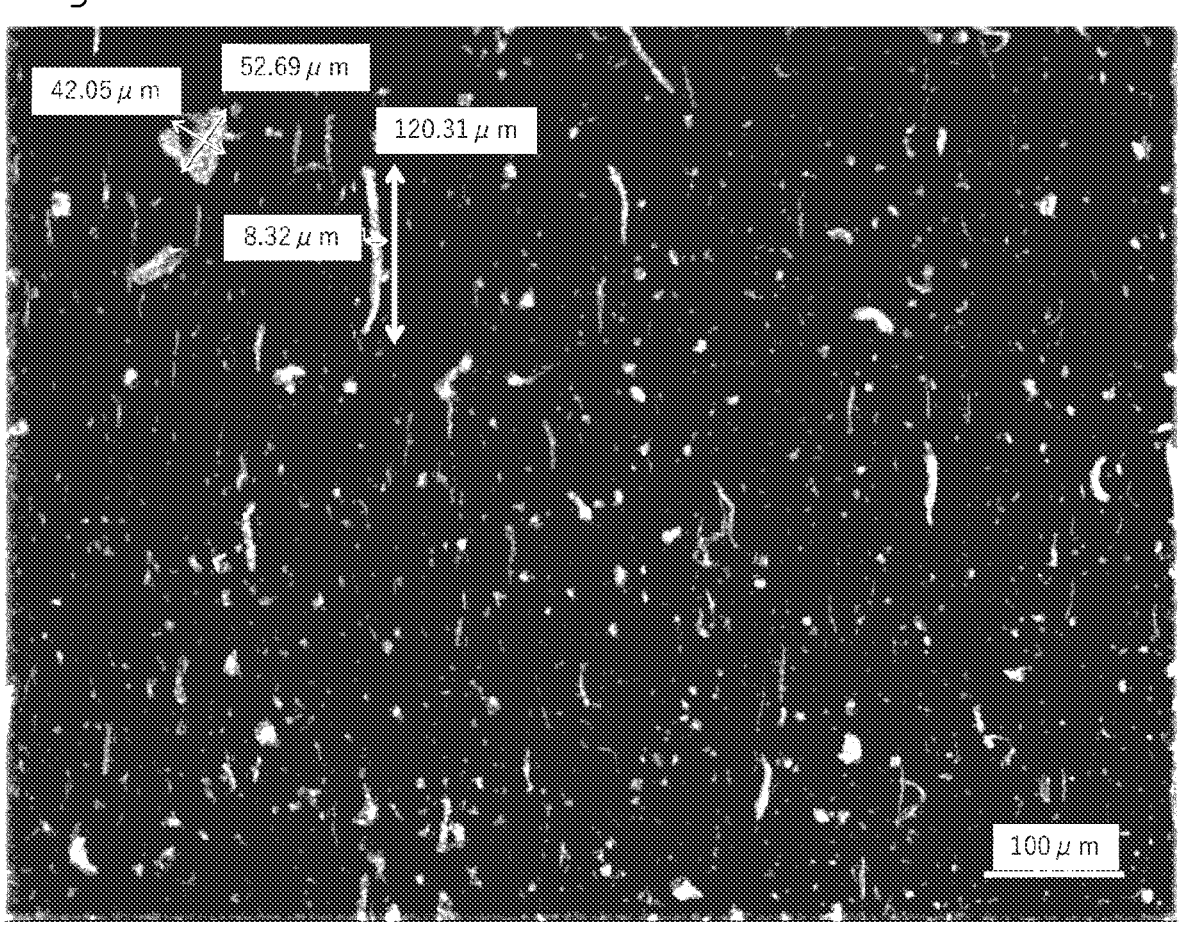
FIG. 2 shows a micro-X-ray CT observation result of a sample according to Comparative Example 2.
Figure 3:
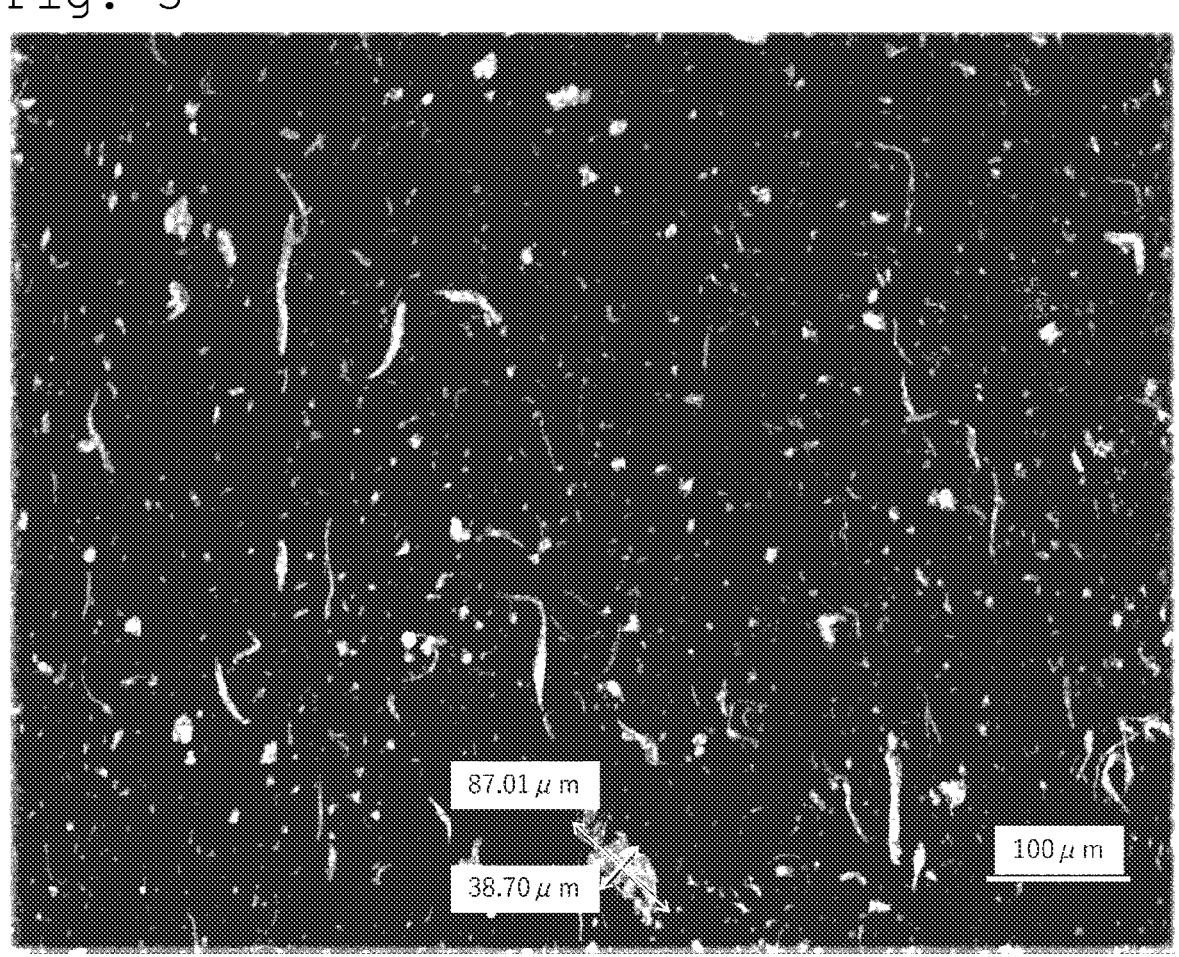
FIG. 3 shows a micro-X-ray CT observation result of a sample according to Comparative Example 3.

As can be seen with reference to FIGS. 1 to 3, it was shown that aggregation of CNF was significantly suppressed in Example 3 as compared with Comparative Examples 2 and 3.

sectional SEM image of the sample according to Comparative Example 3. Contrasts assumed to be CNF were observed in the sample. The sizes of the observed CNFs were about 0.5 μm to 20 μm, and relatively large CNFs were also observed.

From the above, it was shown that the tensile properties of PP to which the cellulose complex according to Example was added were good. That is, when the aggregated portion of CNFs was present in the tensile test, the aggregated portion became the fracture start point, and it is considered that the tensile properties were improved because the aggregation of CNFs could be suppressed (that is, the cellulose complex according to the example was substantially uniformly dispersed in PP) in the example.

In addition, when comparing the result of the tensile test of the cellulose complex/resin composition according to Example 3 with the result of, for example, Comparative Example 1, it is clear that CNFem formed using the MAPP emulsion contributed to the improvement of the tensile properties.

Although the embodiment and examples of the present invention have been described above, the embodiment and examples described above do not limit the invention according to the claims. In addition, it should be noted that not all combinations of features described in the embodiment and examples are essential for the solution to the problem of the invention.

The invention claimed is:

1. A cellulose complex in which a hydroxy group of cellulose containing moisture is bonded to a nonpolar polymer via a reactive group of an aqueous emulsion of a polymer having the reactive group capable of reacting with the hydroxy group and including the nonpolar polymer as a molecular chain, and the polymer containing the reactive group and the nonpolar polymer has a weight average molecular weight of 10,000 or more and 200,000 or less, wherein the nonpolar polymer is polypropylene, the cellulose is cellulose fiber or cellulose nanofiber (CNF), the reactive group is at least one reactive group selected from the group consisting of a succinic anhydride group, a carbonyl group, and a carboxy group, the bond is an ester bond, and the polymer is a graft copolymer, wherein the grafting ratio is 0.2% and 4.0% or less, and the melting point of the polymer is about 80° C. or higher and 175° C. or lower.

2. The cellulose complex according to claim 1, further comprising a captured polymer, the captured polymer being captured by the cellulose complex and containing the reactive group and the nonpolar polymer.

3. The cellulose complex according to claim 1, wherein the polymer containing the reactive group and the nonpolar polymer has a weight average molecular weight of 15,000 or more and 200,000 or less.

4. A cellulose complex/resin composition comprising: the cellulose complex according to claim 1; and a predetermined nonpolar resin.

5. A product comprising the cellulose complex/resin composition according to claim 4.

* * * * *